United States Patent [19]

Harris et al.

[11] Patent Number: 5,272,592

[45] Date of Patent: Dec. 21, 1993

[54] PANELBOARD INTERIOR ASSEMBLY

[75] Inventors: Michael R. Harris, Winchester; Kim D. Wheeler, Lexington, both of Ky.

[73] Assignee: Square D Company, Executive Plaza, Ill.

[21] Appl. No.: 954,844

[22] Filed: Sep. 30, 1992

[51] Int. Cl.$^5$ .............................................. H02B 1/04
[52] U.S. Cl. .................................. 361/637; 361/648; 361/652; 361/673
[58] Field of Search ............... 361/333, 341, 346-347, 361/350, 353-361, 363, 376

[56] References Cited

U.S. PATENT DOCUMENTS

| | | | |
|---|---|---|---|
| 3,588,620 | 6/1971 | Wasileski | 361/363 |
| 4,636,915 | 1/1987 | Perkins et al. | 361/355 |
| 4,646,198 | 2/1987 | Rich et al. | 361/346 |
| 4,646,200 | 2/1987 | M'Sadoques et al. | 361/355 |
| 4,667,268 | 5/1987 | Mrowka | 361/355 |
| 4,916,574 | 4/1990 | Hancock et al. | 361/361 |

Primary Examiner—Gregory D. Thompson
Attorney, Agent, or Firm—Larry I. Golden; Kareem M. Irfan

[57] ABSTRACT

The present invention provides an interior assembly for an electrical distribution device having at least one bus bar integrally formed with branch stabs for electrically connecting to terminals extending from a plurality of circuit interrupters. The assembly includes a generally planar support base having a front face and back face for mounting bus bars. A cover for the front face and a back shield for the back face of the support base have sufficient size to substantially cover the bus bars. The cover and back shield include means for securing the body to the device so that the position of the cover prevents contact between the bus bar and a person's finger or equipment particularly when an individual circuit interrupter is mounted to the device.

18 Claims, 2 Drawing Sheets

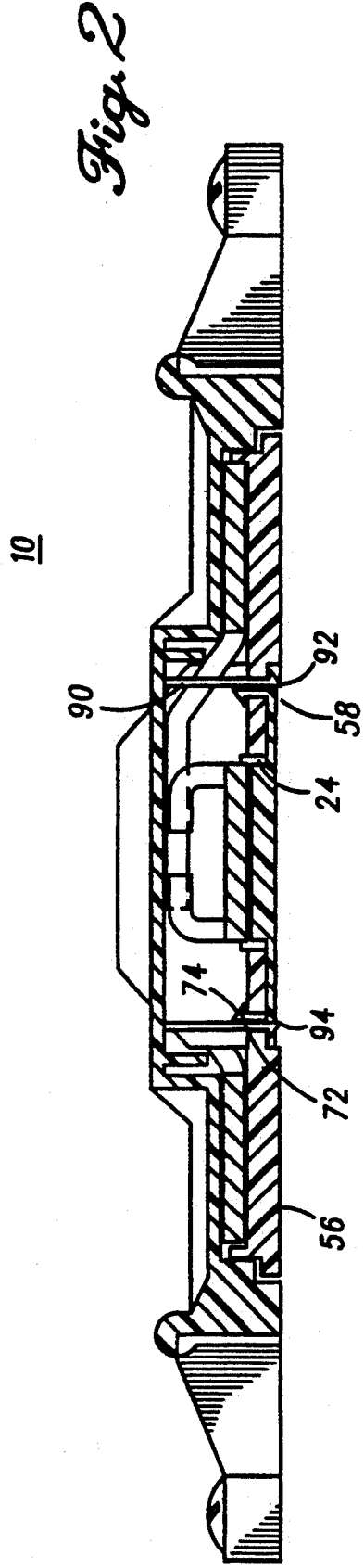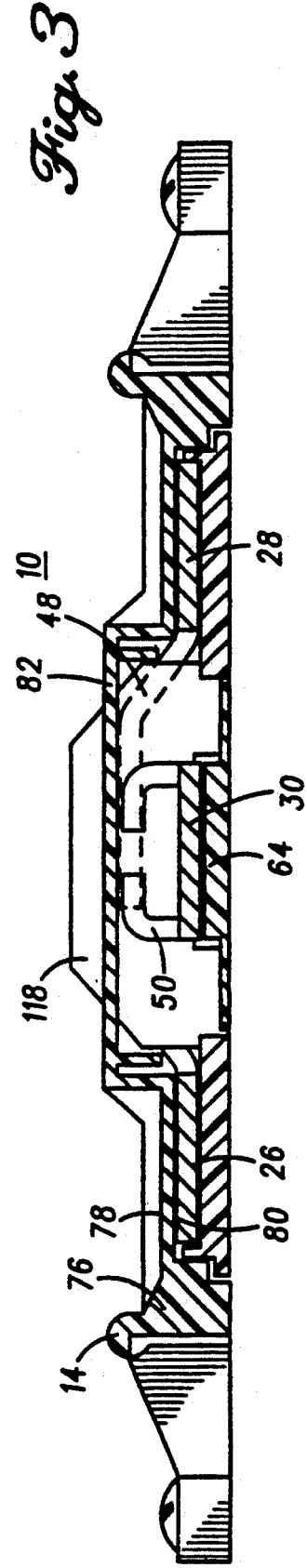

PANELBOARD INTERIOR ASSEMBLY

RELATED APPLICATION

Related co-pending U.S. application Ser. No. 07/954,224 filed on even date herewith discloses a class of a protective cover apparatus which is suitable for use in the present application. The entire teaching and disclosure of that co-pending application is incorporated herein by reference.

FIELD OF THE INVENTION

The present invention relates to an interior assembly of a panelboard, switchboard, electrical distribution device, and the like, and more particularly, to a combination of components like a cover which protects bus bars from accidental contact and is manually assembled and disassembled.

BACKGROUND OF THE INVENTION

Panelboards, switchboards, and other electrical distribution devices are commonly used in residential, commercial, and industrial buildings. Individual circuit interrupters are mounted to these devices to protect branch circuits against overload and fault conditions. Basically, circuit interrupters like circuit breakers and fusible switches comprise a pair of separable contacts, a spring-operated mechanism for effecting separation of the contacts, and a tripping mechanism or fuse which automatically releases the operating mechanism upon the occurrence of an overload or fault condition.

Panelboards and the like are often constructed with bus bars or projecting lugs to form disconnect contacts for the removable individual circuit interrupters. These bus bars and lugs are rigidly attached to the upper surface of the panelboard support molding. Since the bus bars are exposed to the front of the panelboard, it is possible that an operator could be severely burned or shocked if they accidentally touched the terminals while installing the circuit breaker. Furthermore, the main circuit interrupter could be short circuited if conducting material accidentally bridged across the respective bus bars. The bus bars may also be subject to damage during the installation of other components near the panelboard.

Typically, the installation of a panelboard interior to a load center base requires special tools and a variety of different fasteners. The number of tools, parts and operations involved in the panelboard installation poses a high safety risk. Furthermore, many panelboard components are pre-set at the factory and are not readily adapted to various single and multi-phase installations.

In view of the increasing safety requirements for load centers and panelboards there is a need for an interior assembly which protects against accidental exposure to bus bars and is usable with components like circuit breakers already in the market. There is another need for an interior assembly which can be manually assembled in the field in a variety of combinations to fit various installations.

SUMMARY OF THE INVENTION

According to the present invention, an interior assembly is provided for an electrical distribution device having at least one bus bar integrally formed with branch stabs for electrically connecting to terminals extending from a plurality of circuit interrupters. The assembly includes a generally planar support base having a front face and back face. The front face has a channel for each bus bar.

The assembly includes a cover having a generally planar body of sufficient size to substantially cover the bus bar while allowing access to the bus bar with the terminals of a circuit interrupter. The cover having a cross-sectional thickness sufficiently thin to position the cover between the bus bar and each circuit interrupter. The cover has a top face and a bottom face. The bottom face of the cover abutting the top surface of the bus bar. The top face of the cover is configured to allow electrical and mechanical connection between the circuit interrupter and the device.

The assembly further includes means for demountably securing the cover to the support base so that the position of the cover prevents contact between the bus bar and a person's finger or equipment particularly when the individual circuit interrupter is mounted to the assembly. The securing means is manually operated.

The assembly also includes a generally planar back face shield adapted to mount to the back face of the support base. The back face of the support base has a first channel formed therein adapted for mounting the back shield. The first channel having a second channel formed within and adapted for mounting a bus bar through the back face in a nesting arrangement. The back shield includes second means for demountably securing the back shield to the support base so that the position of the back shield prevents contact between the bus bar and the mounting wall of the device. The second securing means is manually operated.

Preferably, the first and second securing means includes prongs which extend downward from the cover and upward from the back shield to engage the edges defining holes in the support base. The holes correspond in position and size to accommodate the prong. The resilient body of the prongs holds the engagement with a spring-like bias. The prongs can be disengaged with the application of force to overcome the bias and bend the prong away from the hole.

The present invention further includes an interior assembly for an electrical distribution device for electrically connecting to terminals extending from a plurality of circuit interrupters. The assembly includes at least one bus bar having stabs for electrical connection with the terminal of the circuit interrupter. A support base having a front face and back face is also included. also includes a cover having generally planar body of sufficient size to substantially cover the bus bar while allowing access to the bus bar with the terminals of a circuit interrupter. The cover has a cross-sectional thickness sufficiently thin to position the cover between the bus bar and each circuit interrupter. The cover has a top face and a bottom face. The bottom face of the cover abuts the top surface of the bus bar so that the bus bar nests and secures between the channel and the cover without fasteners. The top face of the cover is configured to allow electrical and mechanical connection between the circuit interrupter and the device. As previously discussed the assembly also includes securing means.

The present invention also includes a method of safely assembling the interior of an electrical distribution device having a contoured surface for mounting a plurality of circuit interrupters to control branch circuits. The method includes providing a generally planar support base having a front face and a back face. At least one bus bar is attached to the support base. A cover is demountably secured to the support base so that the position of the cover prevents contact between the bus bar and a person's finger or equipment particularly when the individual circuit interrupter is mounted to the device. The cover is manually attached and detached from the support base.

Preferably, the method further includes the step of attaching another bus bar into a channel formed in the back face support base. A back face shield is demountably secured to the support base so that the position of the back shield prevents contact between the bus bar and other equipment. The back shield is manually attached and detached from the support base. The steps of assembling the interior assembly can be safely executed outside of the panelboard environment. After assembly is complete, the interior assembly is mounted with the remainder of the device.

Accordingly, an object of the present invention is to provide a panelboard or like electrical distribution device which minimizes the exposure of a bus bar or disconnect terminal.

Another object of the invention is to provide a panelboard assembly which can be assembled in the field prior to its installation in a load center.

A further object of the invention is to provide a protective cover which does not interfere with the mounting or electrical connection of the circuit interrupter to the panelboard or like device.

Still another object of the invention is to provide an interior assembly for a panelboard which can be manually assembled and, thereafter, manually removed without the need for tools or equipment.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure:

FIG. 2 is a cross-sectional view of the panelboard interior assembly in an assembled combination along the lines 2—2 in FIG. 1; and FIG. 3 is a cross-sectional view of the panelboard interior assembly in an assembled combination along the lines 3—3 in FIG. 1.

DETAILED DESCRIPTION

Figure 1:
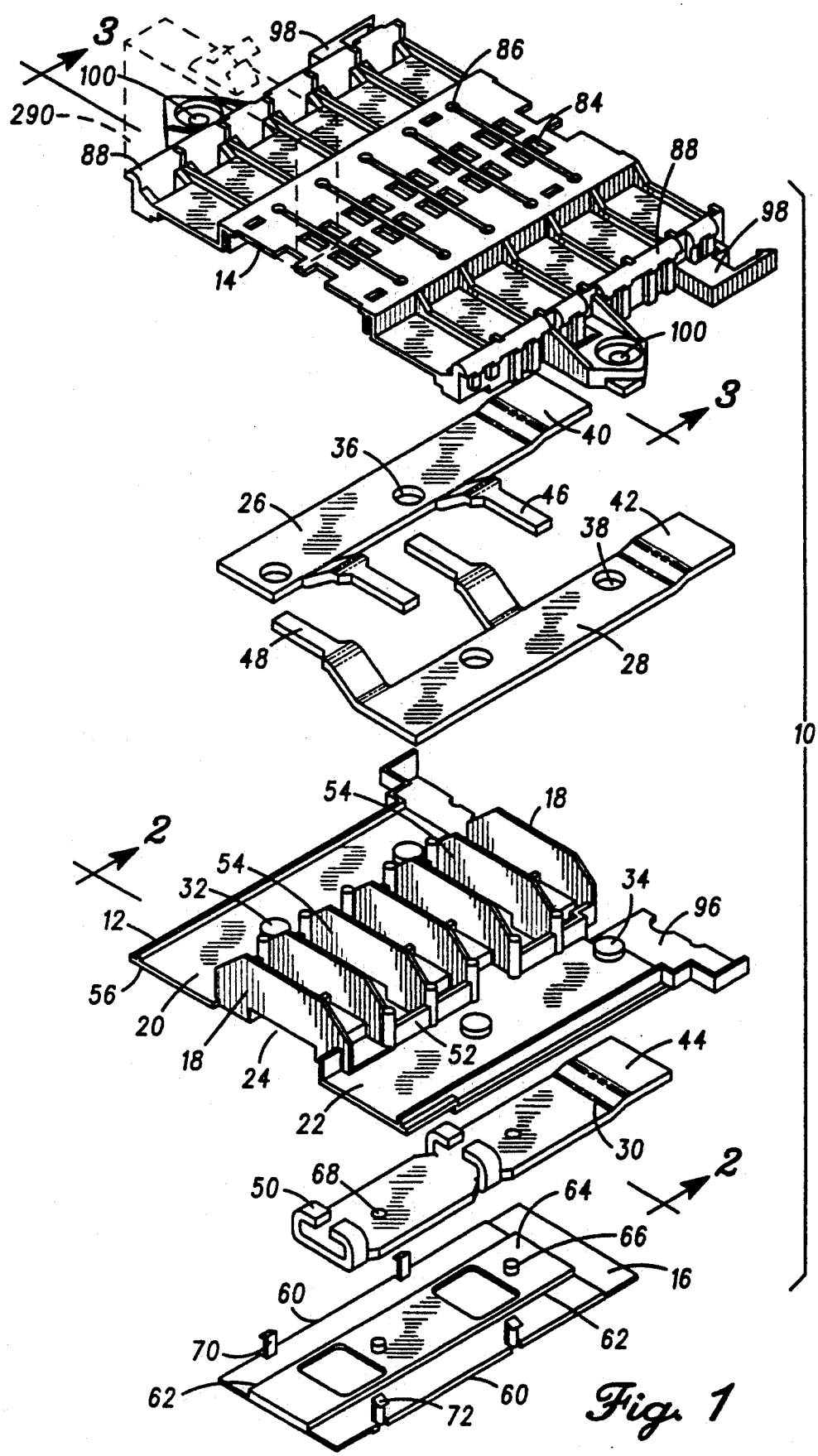
FIG. 1 is an exploded perspective view of an embodiment of a panelboard interior assembly of this invention which is shown in disassembled combination with a cover, bus bars, and a mounting support base.

Referring to FIGS. 1, 2, and 3, an embodiment of a panelboard interior assembly is generally designated as reference 10 and is respectively illustrated disassembled and as an assembled combination. The assembly 10 includes three main interlocking components: a mounting support base 12, a cover 14, and a back wall shield 16. The assembly 10 provides an electrical distribution device for mounting a plurality of circuit breakers such as 290 to control electrical distribution to branch circuits.

The support base 12 aligns and positions circuit breakers for electrical and mechanical connection with the components of the assembly 10. The support base 12 includes a plurality of upstanding, elongated, parallel dividers 18 integrally formed therewith. The dividers 18 separate the adjacent circuit breakers and reduce the probability of accidental bridging of a conductive member between either circuit breaker terminals or bus bars of different electric potential.

Integrally formed with the support base 12 are channels 20, 22, and 24 which provide a nesting alignment of for respective bus bars 26, 28 and 30. FIGS. 1 through 3 specifically illustrate a three-phase load center wherein bus bars 26, 28, and 30 are respectively the A-, C-, and B-phases. Channels 20 and 22 respectively contain projections, like 32 and 34, which mate with corresponding holes 36 and 38 to assist in the proper alignment of the bus bars 26 and 28. The ends 40, 42, and 44 of each bus bar provide for electrical connection to their respective circuit. Any conventional means for making the electrical connection such as with screws, rivets, clips or by welding is suitable. The projections 32, 34 also provide support for the bus bars 26, 28 to prevent movement when the assembly 10 is connected to the remainder of the panelboard and force is exerted on the bus bars 26, 28 to make an electrical connection therewith.

Integrally formed with bus bars 26, 28, and 30 are a plurality of branch stabs 46, 48, and 50, respectively. Each of the circuit breakers is attached to one of the branch stabs like 46. The present invention is also suitable for use with bus bars that are multi-piece units secured together with fasteners. Preferably, the circuit breaker uses a pair of spring-biased contact jaws as its electrical terminals to make an electrical connection with the stabs 46. The contact jaws flex around each side of the branch stab 46 to retain the branch stab with a spring-like bias in a straddle position. Other mechanical fasteners like screws are also suitable for making the electrical connection between the circuit breaker and the stab 46.

Preferably, the support base 12 further assists in the proper assembly of the bus bars 26, 28, and 30 by two methods. First, integrally formed with the support base 12 are a pre-determined series of upstanding walls 52 extending perpendicularly between the ends of adjacent upstanding dividers 18. The sequence of the series allows the stabs 46 to extend between the dividers 18. If the stabs 46 were incorrectly positioned, upstanding walls 52 would prevent the bus bar 28 from properly nesting in the channel 22.

Second, the support base 12 provides a pre-determined series of cut-outs 54 in the back face 56 between the dividers 18. The sequence of the series of cut-outs 54 allows the stabs 50 to extend through the back face 56 of the support base 12 to align between the dividers 18.

On the back face 56 of the support base 12 is a second channel 58 which extends parallel to the bus bar channel 24, but having a greater width. The second channel 58 corresponds in size to the second main component of the assembly 10, namely, the back face shield 16. The side edges 60 of the shield 16 mount flush with the back face 56 of the support base. The edges 62 of an offset 64 on the back shield mount as an insert in the channel 24. The back shield 16 includes projections 66 which are provided to assist in the alignment of the bus bar 30 by mating with holes 68.

The back shield 16 attaches to the support base 12 by means of the integrally formed prongs 70. The prongs 70 extend upwardly and perpendicularly from the generally planar body of the back shield 16. The distal end of the prong includes a flange 72 which mates with the edge defining a hole 74 in the back face 56 of the support base. Each prong 70 corresponds to the position of a hole 74. The body of the prong 70 is resilient and provides a spring-like bias for the engagement between the flange 72 and the corresponding hole 74. The back shield 16 is easily assembled to the support base 12 by hand and without tools. The two components are as easily disassembled by bending each prong 70 to disengage the flange 72 from the edge of the hole 74.

Other means of securing the back shield 16 to the support base 12 are contemplated by the invention. The configuration of the prong 70 is not critical and other types of securing members are suitable for use in the present invention. It is preferred, however, that the securing means be manual and reversible. The invention contemplates reversing the positions of the prong and hole as the securing means. In this arrangement, the prongs extend from the support base 12 to engage the edges defining holes in the cover 14 or back shield 16.

The third main component of the assembly 10 is the cover 14. The cover 14 includes a generally flat planar body 76 which is of sufficient size to substantially cover the bus bars 26, 28, and 30. The cover 14 is defined by a top face 78 and a bottom face 80. The bottom face 80 of the cover abuts the top surface of the bus bars 26, 28 and the stabs 46, 48, and 50.

The top face 78 of the cover is configured to allow electrical and mechanical connection between the circuit breaker, the support base 12 and the stabs 46, 48, and 50. The top face 78 of the cover does not interfere with the mounting of the individual circuit breakers between the dividers 18. The cross-sectional thickness of the cover 14 is sufficiently thin to position the cover 14 between the bus bars 26, 28 and the circuit breakers. The cover 14 is layered or nested between the support base 12 and the housing of the circuit breaker.

The profile of the cover 14 has a slight offset 82 to conform in contour with the raised branch stabs like 46. A first plurality of apertures 84 is provided through the cover 14 in the central area of the offset 82. The apertures 84 are spaced to correspond to the position of the stabs like 46 beneath the cover 14. Each aperture 84 is of sufficient size to allow a contact jaw of the circuit breaker to pass through the cover 14 and engage a pair of contact jaws to electrically and mechanically connect with the stab 46 beneath the cover 14. Thus, the apertures 84 are only slightly larger than an individual contact jaw of the circuit breaker. The apertures 84 are paired together to accommodate the contact jaws of the circuit breaker which are also paired to engage the stabs 46.

A second plurality of thin, elongated apertures 86 is provided through the cover and aligned across the width of the offset 82. The second apertures 86 are spaced to correspond to the position of the dividers 18. Each of the second apertures 86 is shaped to allow the divider 18 to pass through the cover 14 and allow the body to nest around the divider 18.

An important advantage of the present invention is that the circuit breakers can still mount to the support base 12 without interference from the cover 14. During installation, one end of the circuit breaker engages a rail 88 integrally formed with the cover 14. The other end of the circuit breaker passes through the apertures 84 in the body to allow each pair of the circuit breaker contact jaws to engage the stab 46 of the bus bar. The dividers 18 continue to position the circuit breakers during this mounting process. The offset 82 allows the bottom face 80 of the cover to remain in an abutting relationship with the bus bar 26 and in close proximity to, if not abutting, the stabs 46. The offset 82 also prevents the top face 78 of the cover from interfering with the mounting of the circuit breakers to the support base 12. The offset 82 nests around the dividers 18 so that there is no interference by the cover 14 with the positioning of the circuit breaker by the dividers 18.

The cover 14 attaches to the support base 12 by means of the integrally formed prongs 90. The prongs 90 extend downwardly and perpendicularly from the generally planar body of the cover 14. The distal end of the prong includes a flange 92 which mates with the edge defining a hole 94 in the front face 96 of the support base. Each prong 90 corresponds to the position of a hole 94. The body of the prong 90 is resilient and provides a spring-like bias for the engagement between the flange 92 and the corresponding hole 94. The cover 14 is easily assembled to the support base 12 by hand and without tools. The two components are as easily disassembled by bending each prong 90 to disengage the flange 92 from the edge of the hole 94.

The cover 14 nests with the support base 12 to secure the bus bars 26 and 28 therebetween so that the position of the cover 14 prevents contact between the bus bar and a person's finger or equipment particularly when the individual circuit breaker is mounted. As discussed above, other means of securing the cover in position are contemplated for use with the present invention.

The cover 14 includes a pair of clips 98 for engaging the remainder of the device located in a load center. The assembly is then secured to the back wall of such a device by inserting fasteners through holes 100.

The present invention also contemplates a method of safely assembling the interior of an electrical distribution device having a contoured surface for mounting a plurality of circuit interrupters to control branch circuits. The method includes providing a generally planar support base having a front face and a back face. At least one bus bar is attached to the support base. A cover is demountably secured to the support base so that the position of the cover prevents contact between the bus bar and a person's finger or equipment particularly when the individual circuit interrupter is mounted to the device. The cover is manually attached and detached from the support base.

Preferably, the method further includes the step of nesting another bus bar into a channel formed in the back face support base. The nesting of the bus bar between the support base and the cover or between the support base and the back shield secures the bus bar in position without fasteners. A back face shield is demountably secured to the support base so that the position of the back shield prevents contact between the bus bar and other equipment. The back shield is manually attached and detached from the support base.

Another advantage of the present invention is that the steps of assembling the interior assembly can be safely executed outside of the panelboard and load center environment. After assembly is complete, the interior assembly is mounted into with the remainder of the device.

Preferably, the cover of the present invention is made of a resilient, electrically insulating thermoplastic such as NORYL SE-1 made by the General Electric Company. Conventional plastic forming processes such as injection molding are contemplated for use in making covers of the present invention.

The present invention is specifically disclosed for use with one, two, and three pole circuit breakers manufactured by the Square D Company under the catalog designation QO circuit breakers. These circuit breakers are utilized in QO (registered trademark of the Square D Company) load centers which were originally introduced to the marketplace over 35 years ago and have been continually updated.

As those skilled in the art will appreciate, the inventive cover can be adapted and configured for usage with a wide variety of circuit breakers and other electrical distribution devices. Adapting the shape of the panelboard interior assembly components to utilize features of existing circuit breakers allows upgrading the safety of devices already in the marketplace.

It will be further understood that whereas a panelboard is illustrated, the term electrical distribution device is defined to include switchboards and other types of control units. Although the above discussion of the present invention has focused on circuit breakers, other types of circuit interrupters such as fusible switches and the like are contemplated for use with the inventive assembly. Likewise, the inventive assembly can be adapted to provide single or multi-phase circuit protection.

While particular embodiments and applications of the present applications of the present invention has been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. An interior assembly for an electrical distribution device having a plurality of exposed bus bars formed with branch stabs for electrically connecting to terminals extending from a plurality of circuit interrupters, the assembly comprising:

a generally planar support base having a front face and back face, the front face having a channel adapted for each bus bar;

a cover having generally planar body of sufficient size to substantially cover the bus bars while allowing access to the bus bars with the terminals of each circuit interrupter, the cover having a cross-sectional thickness sufficiently thin to position the cover between the bus bars and each circuit interrupter, the cover having a top face and a bottom face, the bottom face of the cover adapted to abut the top surface of the bus bars, the top face of the cover being configured to allow electrical and mechanical connection between the circuit interrupter and the device, the body having an offset area integrally formed therewith, the offset area being centered across the width of the body, the offset area being adapted to bridge the bus bar stabs and the contour of the mounting surface for aligning and mounting each circuit interrupter, the body having a plurality of apertures centrally located on the offset area which extend through the body, the apertures being positioned above the bus bar stabs which electrically connect to each circuit interrupter, the apertures being larger than the width of the circuit interrupter terminals so that each terminal extends below the body to make electrical connection with one of the bus bars, the body further having two rails integrally formed therewith, each rail upstanding from the top face of the body and extending along the edge of the top face parallel to length of the offset area, the rails adapted to removably engage one end of each circuit interrupter; and means for demountably securing the cover to the support base so that the position of the cover prevents contact between the bus bar stabs and a person's finger or equipment particularly when each individual circuit interrupter is mounted to the assembly, the securing means being manually operated.

2. The assembly of claim 1 wherein the securing means includes a plurality of securing members integrally formed with the cover, each securing member extending downwardly and perpendicularly from the cover, a hole is formed in the support base corresponding in size to demountably engage one of the securing members and being positioned to allow manual access to each securing member after engagement so that the cover is manually attached and detached from the support base, each securing member is a flexible, reusable prong having a flange located at the distal end thereof, the flange extending outwardly from the prong to engage the edge defining the corresponding hole.

3. The assembly of claim 1 wherein the assembly further includes:

a generally planar back face shield adapted to mount to the back face of the support base the back face of the support base having a first channel being formed therein adapted for mounting the back shield, the first channel having a second channel formed within and being adapted for mounting a bus bar through the back face in a nesting arrangement; and second means for demountably securing the back shield to the support base so that the position of the back shield prevents contact between the bus bar and the mounting wall of the device, the second securing means being manually operated.

4. The assembly of claim 3 wherein the second securing means includes a second plurality of securing members integrally formed with the back shield, each securing member extending upwardly and perpendicularly from the back shield, a hole being formed in the support base corresponding in size to demountably engage each second securing member and being positioned to allow manual access to each securing member after engagement so that the back shield is manually attached and detached from the support base, each second securing member is a flexible, reusable prong having a flange located at the distal end thereof, the flange extending outwardly from the prong to engage the edge defining the corresponding hole.

5. An interior assembly for an electrical distribution device for electrically connecting to terminals extending from a plurality of circuit interrupters, the assembly comprising:

a plurality of bus bars having stabs for electrical connection with the terminal of the circuit interrupter;

a generally planar support base having a front face and back face, the front face having a channel for each bus bar;

a cover having generally planar body of sufficient size to substantially cover the bus bars while allowing access to the bus bars with the terminals of each circuit interrupter, the cover having a cross-sectional thickness sufficiently thin to position the cover between the bus bars and each circuit interrupter, the cover having a top face and a bottom face, the bottom face of the cover adapted to abut the top surface of the bus bars, the top face of the cover being configured to allow electrical and mechanical connection between the circuit interrupter and the device, the cover further having an offset area integrally formed therewith and centered across the width of the cover, the offset area being adapted to bridge the bus bar stabs, the cover having a first plurality of apertures centrally located on the offset which extend through the cover, the first plurality of apertures being positioned above the bus bar stabs which electrically connect to the individual circuit interrupters, the first plurality of apertures being smaller than the width of the bus bar stabs and the housing of each circuit interrupter so that each circuit interrupter housing abuts the top face of the cover and each circuit interrupter terminal extends through the body to make electrical connection with one of the bus bar stabs, the cover further having a second plurality of apertures located on the offset area which extend through the cover, the second plurality of apertures correspond in configuration and position to the contour mounting surface to allow the mounting surface to extend through the body so that the body is layered between the bus bar stabs and the circuit interrupters without interfering with the electrical connection therebetween; and means for demountably securing the cover to the support base so that the position of the cover prevents contact between the bus bar stabs and a person's finger or equipment particularly when the individual circuit interrupter is mounted to the assembly, the securing means being manually operated.

6. An interior assembly for an electrical distribution device having a plurality of bus bars formed with branch stabs for electrically connecting to terminals extending from a plurality of circuit interrupters, the assembly comprising:

a generally planar support base having a front face and back face, the front face having a channel adapted for each bus bar;

a cover having generally planar body of sufficient size to substantially cover the bus bars while allowing access to the bus bars with the terminals of each circuit interrupter, the cover having a cross-sectional thickness sufficiently thin to position the cover between the bus bars and each circuit interrupter, the cover having a top face and a bottom face, the bottom face of the cover adapted to abut the top surface of the bus bars, the top face of the cover being configured to allow electrical and mechanical connection between the circuit interrupter and the device, the cover further having an offset area integrally formed therewith and centered across the width of the cover, the offset area adapted to bridge the bus bar stabs, the cover having a first plurality of apertures centrally located on the offset which extend through the cover, the first plurality of apertures being positioned on both sides of each bus bar stab while leaving the body to cover over the bus bar stab itself, the size of each aperture being adapted to accommodate one of the circuit interrupter terminals therethrough so that each circuit interrupter housing abuts the top face of the cover and each circuit interrupter terminal extends through the body to make electrical connection with the bus bar stab; and means for demountably securing the cover to the support base so that the position of the cover prevents contact between the bus bar stabs and a person's finger or equipment particularly when each individual circuit interrupter is mounted to the assembly, the securing means being manually operated.

7. The assembly of claim 6 wherein the bottom face of the body in the offset area is adapted to abut the upper surface of each bus bar stab.

8. An interior assembly for an electrical distribution device having a plurality of exposed bus bars formed with branch stabs for electrically connecting to terminals extending from a plurality of circuit interrupters, the assembly comprising:

a generally planar support base having a front face and back face, the front face having a channel adapted for each bus bar;

a cover having generally planar body of sufficient size to substantially cover the bus bars while allowing access to the bus bars with the terminals of each circuit interrupter, the cover having a cross-sectional thickness sufficiently thin to position the cover between the bus bars and each circuit interrupter, the cover having a top face and a bottom face, the bottom face of the cover adapted to abut the top surface of the bus bars, the top face of the cover being configured to allow electrical and mechanical connection between the circuit interrupter and the device, the cover further having an offset area integrally formed therewith and centered across the width of the cover, the offset area being adapted to bridge the bus bar stabs, the cover having a first plurality of apertures centrally located on the offset which extend through the cover, the first plurality of apertures being positioned above the bus bar stabs which electrically connect to the individual circuit interrupters, the first plurality of apertures being smaller than the width of the bus bar stabs and the housing of each circuit interrupter so that each circuit interrupter housing abuts the top face of the cover and each circuit interrupter terminal extends through the body to make electrical connection with one of the bus bar stabs, the cover further having a second plurality of apertures located on the offset area which extend through the cover, the second plurality of apertures correspond in configuration and position to the contour mounting surface to allow the mounting surface to extend through the body so that the body is layered between the bus bar stabs and the circuit interrupters without interfering with the electrical connection therebetween; and means for demountably securing the cover to the support base so that the position of the cover prevents contact between the bus bar stabs and a person's finger or equipment particularly when the individual circuit interrupter is mounted to the assembly, the securing means being manually operated.

9. An interior assembly for an electrical distribution device for electrically connecting to terminals extending from a plurality of circuit interrupters, the assembly comprising:

a plurality of bus bars having stabs for electrical connection with the terminal of the circuit interrupter;

a generally planar support base having a front face and back face, the front face having a channel for each bus bar;

a cover having generally planar body of sufficient size to substantially cover the bus bars while allowing access to the bus bars with the terminals of each circuit interrupter, the cover having a cross-sectional thickness sufficiently thin to position the cover between the bus bars and each circuit interrupter, the cover having a top face and a bottom face, the bottom face of the cover adapted to abut the top surface of the bus bars so that the bus bars nests and secures between the channel and the cover without fasteners, the top face of the cover being configured to allow electrical and mechanical connection between the circuit interrupter and the device, the body having an offset area integrally formed therewith, the offset area being centered across the width of the body, the offset area being adapted to bridge the bus bar stabs and the contour of the mounting surface for aligning and mounting each circuit interrupter, the body having a plurality of apertures centrally located on the offset area which extend through the body, the apertures being positioned above the bus bar stabs which electrically connect to each circuit interrupter, the apertures being larger than the width of the circuit interrupter terminals so that each terminal extends below the body to make electrical connection with one of the bus bars, the body further having two rails integrally formed therewith, each rail upstanding from the top face of the body and extending along the edge of the top face parallel to length of the offset area, the rails adapted to removably engage one end of each circuit interrupter; and means for demountably securing the cover to the support base so that the position of the cover prevents contact between the bus bar stabs and a person's finger or equipment particularly when each individual circuit interrupter is mounted to the assembly, the securing means being manually operated.

10. The assembly of claim 9 wherein the securing means includes a plurality of securing members integrally formed with the cover, each securing member extending downwardly and perpendicularly from the cover, a hole being formed in the support base corresponding in size to demountably engage each securing member and being positioned to allow manual access to each securing member after engagement so that the cover is manually attached and detached from the support base, each securing member is a flexible, reusable prong having a flange located at the distal end thereof, the flange extending outwardly from the prong to engage the edge defining the corresponding hole.

11. The assembly of claim 9 wherein the assembly further includes:

a generally planar back face shield adapted to mount to the back face of the support base the back face of the support base having a first channel being formed therein adapted for mounting the back shield, the first channel having a second channel formed within and being adapted for mounting a bus bar through the back face in a nesting arrangement; and second means for demountably securing the back shield to the support base so that the position of the back shield prevents contact between the bus bar and the mounting wall of the device, the second securing means being manually operated.

12. The assembly of claim 11 wherein the second securing means includes a second plurality of securing members integrally formed with the back shield, each second securing member extending upwardly and perpendicularly from the back shield, a hole being formed in the support base corresponding in size to demountably engage each second securing member and being positioned to allow manual access to each securing member after engagement so that the back shield is manually attached and detached from the support base, each second securing member is a prong having a flange located at the distal end thereof, the flange extending outwardly from the prong to engage the edge defining the corresponding hole.

13. The assembly of claim 9 wherein the support base, cover and the base shield is made of an electrically insulating material.

14. The assembly of claim 13 wherein the material is a thermoplastic.

15. The assembly of claim 9 wherein the assembly further includes a circuit breaker as the circuit interrupter.

16. The assembly of claim 9 wherein assembly further includes a fusible switch as the circuit interrupter.

17. An interior assembly for an electrical distribution device for electrically connecting to terminals extending from a plurality of circuit interrupters, the assembly comprising:

a plurality of bus bars having stabs for electrical connection with the terminal of the circuit interrupter;

a generally planar support base having a front face and back face, the front face having a channel for each bus bar;

a cover having generally planar body of sufficient size to substantially cover the bus bars while allowing access to the bus bars with the terminals of each circuit interrupter, the cover having a cross-sectional thickness sufficiently thin to position the cover between the bus bars and each circuit interrupter, the cover having a top face and a bottom face, the bottom face of the cover adapted to abut the top surface of the bus bars so that the bus bars nests and secures between the channel and the cover without fasteners, the top face of the cover being configured to allow electrical and mechanical connection between the circuit interrupter and the device, the body having an offset area integrally formed therewith, the offset area being centered across the width of the body, the offset area being adapted to bridge the bus bar stabs and the contour of the mounting surface for aligning and mounting each circuit interrupter, the body having a plurality of apertures centrally located on the offset area which extend through the body, the apertures being positioned above the bus bar stabs which electrically connect to each circuit interrupter, the apertures being larger than the width of the circuit interrupter terminals so that each terminal extends below the body to make electrical connection with one of the bus bars, the cover further having an offset area integrally formed therewith and centered across the width of the cover, the offset area adapted to bridge the bus bar stabs and the contour of the mounting surface for aligning and mounting the circuit interrupters, the cover having a first plurality of apertures centrally located on the offset which extend through the cover, the first plurality of apertures being positioned on both sides of each bus bar stab while leaving the body to cover the bus bar stab itself, the size of each aperture being adapted to accomodate one of the circuit interrupter terminals therethrough so that each circuit interrupter housing abuts the top face of the cover and each circuit interrupter terminal extends through the body to make electrical connection with one of the bus bar stabs; and means for demountably securing the cover to the support base so that the position of the cover prevents contact between the bus bar stabs and a person's finger or equipment particularly when each individual circuit interrupter is mounted to the assembly, the securing means being manually operated.

18. The assembly of claim 17 wherein the bottom face of the cover in the offset area abuts the upper surface of the bus bar stab.

* * * * *